(12) United States Patent
Ojala et al.

(10) Patent No.: US 9,351,070 B2
(45) Date of Patent: May 24, 2016

(54) POSITIONAL DISAMBIGUATION IN SPATIAL AUDIO

(75) Inventors: Pasi Ojala, Kirkkonummi (FI); Jussi Virolainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 561 days.

(21) Appl. No.: 13/380,514

(22) PCT Filed: Jun. 30, 2009

(86) PCT No.: PCT/EP2009/058171
§ 371 (c)(1),
(2), (4) Date: Dec. 22, 2011

(87) PCT Pub. No.: WO2011/000409
PCT Pub. Date: Jan. 6, 2011

(65) Prior Publication Data
US 2012/0101610 A1  Apr. 26, 2012

(51) Int. Cl.
G06F 17/00 (2006.01)
H04R 3/00 (2006.01)
G01S 3/808 (2006.01)
G01S 3/809 (2006.01)
G10L 19/008 (2013.01)
H04S 7/00 (2006.01)

(52) U.S. Cl.
CPC .............. H04R 3/005 (2013.01); G01S 3/809 (2013.01); G01S 3/8083 (2013.01); G10L 19/008 (2013.01); H04S 7/301 (2013.01); H04R 2430/20 (2013.01)

(58) Field of Classification Search
None
See application file for complete search history.

(56) References Cited

U.S. PATENT DOCUMENTS

| | | | |
|---|---|---|---|
| 6,047,192 A | 4/2000 | Maloney et al. | |
| 7,116,787 B2 | 10/2006 | Faller | |
| 7,275,008 B2 | 9/2007 | Plyvanainen | |
| 2002/0167444 A1 | 11/2002 | Lee | |
| 2006/0045289 A1 | 3/2006 | Kujirai et al. | |
| 2007/0159924 A1 | 7/2007 | Vook | |
| 2007/0291968 A1* | 12/2007 | Joublin | G01S 3/8055 381/309 |
| 2008/0089531 A1* | 4/2008 | Koga | H04R 3/005 381/92 |
| 2009/0144063 A1* | 6/2009 | Beack | G10L 19/008 704/500 |
| 2012/0101610 A1 | 4/2012 | Ojala et al. | |

FOREIGN PATENT DOCUMENTS

| | | |
|---|---|---|
| CN | 1286008 A | 2/2001 |
| CN | 1383282 A | 12/2002 |
| CN | 1905741 A | 1/2007 |
| CN | 101013155 A | 8/2007 |

(Continued)

OTHER PUBLICATIONS

Faller et al., "Binaural Cue Coding—Part II: Schemes and Applications", IEEE Transactions on Speech and Audio Processing, vol. 11, Issue No. 6, Nov. 2003, pp. 520-531.

(Continued)

*Primary Examiner* — Fan Tsang
*Assistant Examiner* — David Siegel
(74) *Attorney, Agent, or Firm* — Alston & Bird LLP

(57) ABSTRACT

A method including: obtaining phase information dependent upon a time-varying phase difference between captured audio channels; obtaining sampling information relating to time-varying spatial sampling of the captured audio channels; and processing the phase information and the sampling information to determine audio control information for controlling spatial rendering of the captured audio channels.

15 Claims, 5 Drawing Sheets

(56) References Cited

FOREIGN PATENT DOCUMENTS

| EP | 1 551 205 A1 | 7/2005 |
|---|---|---|
| EP | 1862813 | 12/2007 |
| GB | 2366617 | 3/2002 |
| RU | 2529591 C2 | 8/2013 |
| WO | 2007/089131 | 8/2007 |
| WO | 2007089131 | 8/2007 |
| WO | 2009048291 | 4/2009 |
| WO | 2009109217 | 9/2009 |
| WO | 2009153053 | 12/2009 |

OTHER PUBLICATIONS

Blauert, "Spatial Hearing with One Sound Source", Spatial Hearing: The Psychophysics of Human Sound Localization, Revised Edition, The MIT Press, 1997, pp. 178-191.
Faller, "Parametric Multichannel Audio Coding: Synthesis of Coherence Cues", IEEE Transactions on Audio, Speech, and Language Processing, vol. 14, Issue 1, Jan. 2006, pp. 299-310.
Daniels et al., "Multi-Channel Audio Processing Using a Unified Domain Representation", AES Convention:119, Oct. 2005, 7 pages.
International Search Report received for corresponding Patent Cooperation Treaty Application No. PCT/EP2009/058171, dated Mar. 17, 2010, 4 pages.
Written Opinion received for corresponding Patent Cooperation Treaty Application No. PCT/EP2009/058171, dated Mar. 17, 2010, 7 pages.
International Preliminary Report on Patentability received for corresponding Patent Cooperation Treaty Application No. PCT/IB2010/054033, dated Jan. 4, 2012, 8 pages.
Trenholm B.A. et al. "Resolution of azimuthal and vertical arrival angles at a rotatable horizontal line array" Oceans 1984, [online] vol. 19, Sep. 1987, pp. 362-268. URL: http://ieeexplorer.ieee.org/stamp/stamp.jsp?tp +&arnumber=1160913&userType=inst>.
Office Action received for corresponding Russian Application No. 2012102700, dated Apr. 10, 2013, 13 pages.
Office Action received for corresponding Russian Application No. 2012102700, dated Oct. 3, 2013, 11 pages.
J. Breebaart et al., MPEG Spatial Audio Coding / MPEG Surround: Overview and Current Status, AES 119th Convention, NY, Oct. 2005, [D2]: pp. 2, 4, 9, 10-14.
J. Breebaart et al., Parametric Coding of Stereo Audio, EURASIP Journal on Applied Signal Processing Sep. 2005, 1305-1322.
International Preliminary Report on Patentability for Application No. PCT/EP2009/058171 dated Jan. 4, 2012.
Office Action for Chinese Application No. 200980160262.1 dated Sep. 30, 2014.
Office Action for Vietnam Application No. 1-2011-03491 dated Dec. 31, 2014.
Communication Pursuant to Article 94(3) EPC from European Patent Application No. 09 780 022.1 dated Feb. 25, 2015.
Handzel A A et al.; "Biomimetic Sound-Source Localization"; *IEEE Sensors Journal, IEEE Service Center*, New York, NY, US; vol. 2, No. 6; Dec. 1, 2002; pp. 607-616; XP001171158.
Communication pursuant to Article 94(3) EPC for European Application No. 09780022.1 dated Oct. 19, 2015.

\* cited by examiner

FRONT - TABLE 1                              9

| time | $T_A - T_B = \varnothing_{AB}$ | $\theta_{AB}$ | $\varnothing * \theta$ |
|------|-------------------------------|---------------|------------------------|
| $t_1$ | -ve | -ve | +ve |
| $t_2$ | 0 | 0 | ~0 |
| $t_3$ | +ve | +ve | +ve |

BACK - TABLE 2                               9

| time | $T_A - T_B = \varnothing_{AB}$ | $\theta_{AB}$ | $\varnothing * \theta$ |
|------|-------------------------------|---------------|------------------------|
| $t_1$ | +ve | -ve | -ve |
| $t_2$ | 0 | 0 | ~0 |
| $t_3$ | -ve | +ve | -ve |

POSITIONAL DISAMBIGUATION IN SPATIAL AUDIO

RELATED APPLICATION

This application was originally filed as PCT Application No. PCT/EP2009/058171 filed Jun. 30, 2009.

FIELD OF THE INVENTION

Embodiments of the present invention relate to positional disambiguation in spatial audio. In particular, they relate to apparatus, methods, computer programs that enable positional disambiguation in spatial audio.

BACKGROUND TO THE INVENTION

A human has two ears. The path of audio from an audio source to the left ear is typically different to the path of audio from the audio source to the right ear. An important audio cue for a human is the time difference (phase difference) between the path to the left ear and the path to the right ear. However, phase difference alone as a cue creates positional ambiguity because a locus of a sound source for a particular phase difference is typically a circle centered on a line passing through both ears rather than a point.

The human head and body diffracts sound waves. The effect is more anisotropic in the up/down directions than the left/right directions. An amplitude difference (level difference) between the path to the left ear and the path to the right ear may give a cue that enables a human to position the audio source up or down but may be insufficient to position a source front/back.

There exists a problem of how to render spatial audio (surround sound) using a multi-loudspeaker configuration. It may be that the microphone configuration introduces an ambiguity in the position of a sound source which may result, for example, in the sound source being rendered behind a listener when it should be rendered in front of the listener or may result in the sound source being rendered in front of a listener when it should be rendered behind the listener.

BRIEF DESCRIPTION OF VARIOUS EMBODIMENTS OF THE INVENTION

According to various, but not necessarily all, embodiments of the invention there is provided a method comprising: obtaining phase information dependent upon a time-varying phase difference between captured audio channels; obtaining sampling information relating to time-varying spatial sampling of the captured audio channels; and processing the phase information and the sampling information to determine audio control information for controlling spatial rendering of the captured audio channels.

According to various, but not necessarily all, embodiments of the invention there is provided a computer program which when loaded in to a processor enables the processor to: process phase information dependent upon a time-varying phase difference between captured audio channels and sampling information relating to time-varying spatial sampling of the captured audio channels to determine audio control information for controlling spatial rendering of the captured audio channels.

According to various, but not necessarily all, embodiments of the invention there is provided an apparatus comprising: circuitry configured to process: phase information dependent upon a time-varying phase difference between captured audio channels; and sampling information relating to time-varying spatial sampling of the captured audio channels to determine audio control information for controlling spatial rendering of the captured audio channels.

According to various, but not necessarily all, embodiments of the invention there is provided a method comprising: capturing audio channels using time varying spatial sampling; performing parametric audio encoding of captured audio channels to produce a reference audio signal and audio parameters; sending to a remote destination the reference audio signal and the audio parameters; and sending to the remote destination sampling information relating to the time varying spatial sampling of the captured audio channels.

According to various, but not necessarily all, embodiments of the invention there is provided a method comprising: receiving parameterized audio; receiving control information; spatial rendering the captured audio channels using multiple loudspeakers, wherein the control information is used to control relative gain of the multiple loudspeakers to disambiguate a bearing of a rendered sound source.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
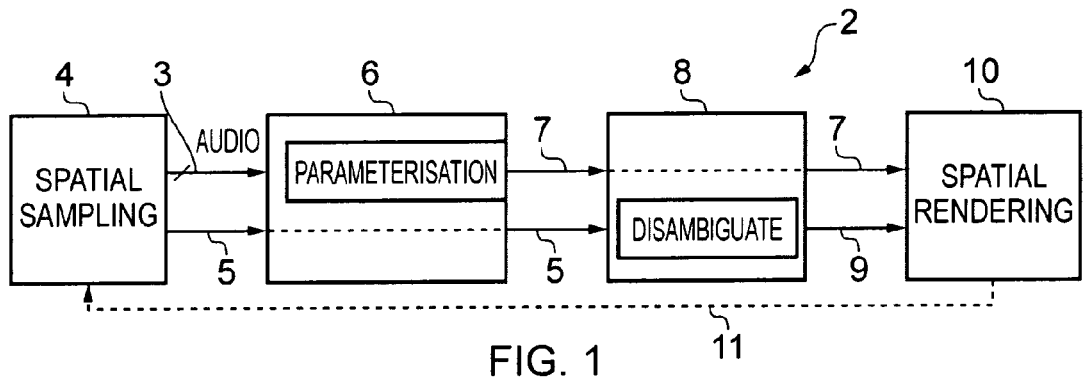
FIG. 1 schematically illustrates a system for multi-channel audio capture and multi-channel spatial audio rendering.

FIG. 1 schematically illustrates a system 2 for multi-channel audio capture and multi-channel spatial audio rendering. The system 2 provides for parametric encoding of multi-channel audio. The system 2 also enables disambiguation of a bearing of an audio source.

The system 2 is schematically illustrated, in this example, as comprising a plurality of blocks including: a spatial sampling block 4 for multi-channel audio capture; a parameterization block 6 for parametrically encoding the multi-channel audio as parameterized audio 7; a disambiguation block 8 for producing disambiguating control information 9; and a spatial rendering block 10 which decodes the parameterized audio 7 and uses the disambiguating control information 9 to provide improved spatial audio rendering.

The spatial sampling block 4 enables N-channel audio capture using N spatially separated microphones. Each audio channel is associated with a microphone.

The spatial sampling block 4 enables time varying spatial sampling of the N captured audio channels. That is the N microphone positions associated with the N channels change with time. This may be achieved by selectively enabling a sub-set of a set of microphones or by moving an array of microphones.

For example, the time varying spatial audio sampling may be performed using a fixed N microphone array in which the microphones have fixed relative positions. The microphone array is then placed at a fixed location but it is moved through different orientations.

Such a microphone array may comprise a planar array of microphones that are arranged in a plane but not along the same straight line. Alternatively, the microphone array may comprise a linear array of microphones that are arranged along the same straight line.

Figure 2A:
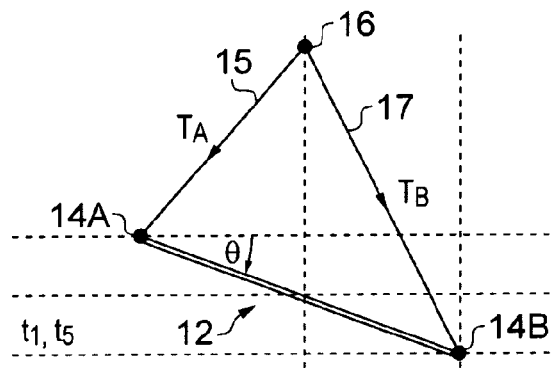
FIGS. 2A, 2B and 2C illustrate how an orientation of the linear microphone array changes with time.
Figure 2B:
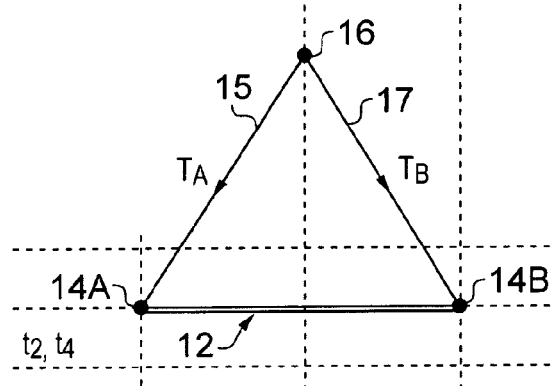
Figure 2C:
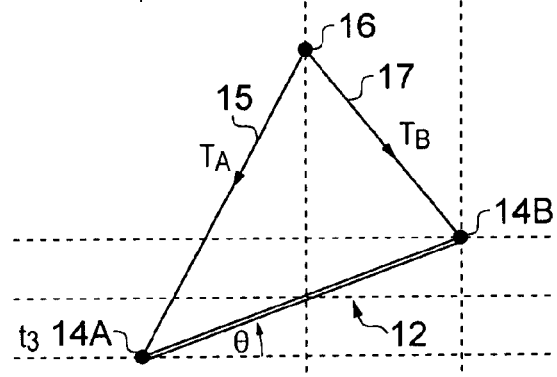

In a stereo or binaural implementation, the microphone array 12 may comprise a pair of microphones 14A, 14B as illustrated in FIGS. 2A, 2B, 2C. The microphones 14A, 14B may have a fixed separation d.

FIGS. 2A, 2B and 2C illustrate how an orientation of the linear array 12 may change with time. The orientation may periodically oscillate as, for example, illustrated in FIGS. 2A to 2C.

Orientation changes of the microphone array 12 may be detected using motion sensors. As an example, when a user is wearing binaural microphones (a microphone is near both of the listener's ears), the orientation of the listener's head (the microphone array orientation) relative to the environment is monitored using a headtracker. Thus an external and separate apparatus may be used to measure array orientation.

The linear array 12 lies in the plane of the paper and its orientation changes by an angle θ lying within the plane of the paper. At time t1 illustrated in FIG. 2A, angle θ is negative and the microphone 14A leads the microphone 14B. Then at time t2 illustrated in FIG. 2B, angle θ is zero and the microphone 14A and the microphone 14 B are level. At time t3 illustrated in FIG. 2C, angle θ is positive and the microphone 14B leads the microphone 14A. Then at time t4 illustrated in FIG. 2B, angle θ is zero and the microphone 14A and the microphone 14B are level. Then at time t5, illustrated in FIG. 2A, angle θ is negative and the microphone 14A leads the microphone 14B.

The FIGS. 2A to 2C illustrate one possible location for an audio source 16. This location is used for illustrative purpose only.

The audio path 15 from the audio source 16 to the microphone 14A has an associated time delay $T_A(t)$ The audio path 17 from the audio source 16 to the microphone 14B has an associated time delay $T_B(t)$.

The audio source 16 is located 'forward' of the linear array 12. The phase difference φ between the audio path 15 from the audio source 16 to the microphone 14A and the audio path 17 from the audio source 16 to the microphone 14B may be expressed as $T_A(t)-T_B(t)$. When the microphone 14A leads the microphone 14B (FIG. 2A) the phase difference is negative. When the microphone 14B leads the microphone 14A (FIG. 2C) the phase difference is positive. Thus when the audio source 16 is located 'forward' of the linear array 12, the phase difference φ has the same sense as the orientation angle θ. When the phase difference φ is negative, the orientation angle θ is also negative. When the phase difference φ is positive, the orientation angle θ is also positive. This relationship is evident from Table 2 illustrated in FIG. 3A. The change in the phase difference φ correlates with the change in the orientation angle θ.

When the audio source 16 is instead located 'backward' of the linear array 12, the phase difference is positive when the microphone 14A leads the microphone 14B (FIG. 2A). When the microphone 14B leads the microphone 14A (FIG. 2C) the phase difference is negative. Thus when the audio source 16 is located 'backward' of the linear array 12, the phase difference φ has the opposite sense as the orientation angle θ. When the phase difference φ is negative, the orientation angle θ is positive. When the phase difference φ is positive, the orientation angle θ is negative. This relationship is evident from Table 2 illustrated in FIG. 3B. The change in the phase difference φ reverse correlates with the change in the orientation angle θ.

A sound source with an associated phase difference φ, would have an ambiguous location. It may either be located forward of the array 12 or backward of the array 12. The time varying spatial sampling provided by the moving array 12 enables disambiguation of the sound source location. For example, if the time varying phase difference φ correlates with the time varying orientation angle θ, the sound source 16 is located forward of the array 12 and if the time varying phase difference φ reverse correlates with the time varying orientation angle θ, the sound source 16 is located backward of the array 12.

It is therefore possible to process phase information and sampling information to produce disambiguating control information 9 for controlling spatial rendering of the captured audio channels. This occurs in disambiguation block 8 in FIG. 1.

Figure 5:
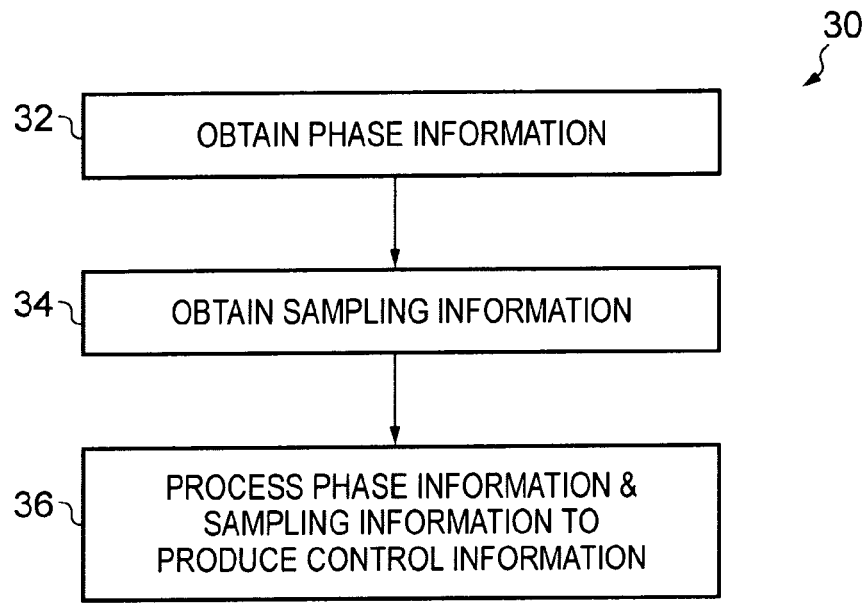
FIG. 5 schematically illustrates a process that produces disambiguating control information for controlling spatial rendering of the captured audio channels.

FIG. 5 schematically illustrates such a process 30. The process or method 30, starts at block 32 where phase information dependent upon a time-varying phase difference between captured audio channels is obtained. In the example described with reference to FIGS. 2A to 2C, the phase information may be expressed as the time varying phase difference φ(t) (e.g. $T_A(t)-T_B(t)$).

At block 34 sampling information 5 relating to time-varying spatial sampling of the captured audio channels is obtained. In the example described with reference to FIGS. 2A to 2C, the sampling information 5 may be expressed as the time varying orientation angle θ(t).

Then at block 36, the phase information and the sampling information 5 are processed to determine audio control information 9 for controlling spatial rendering of the captured audio channels. The audio control information 9 enables disambiguation of a bearing/location of an audio source.

Figure 7:
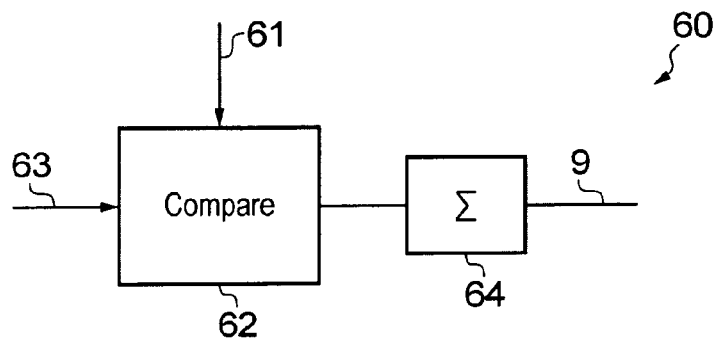
FIG. 7 schematically illustrates a detailed process for producing disambiguating control information.

FIG. 7 schematically illustrates a process 60 which is an example of one of many processes suitable for use at block 36. In process 60, block 62 receives phase information 61 as a first input and receives sampling information 63 as a second input.

The block 62 compares synchronous characteristics of the phase information 61 and the sampling information 63 and then integrates the comparison results at block 64 to produce audio control information 9. The audio control information 9 enables disambiguation of a bearing/location of an audio source.

In the example described with reference to FIGS. 2A to 2C, the phase information 61 may be expressed as the time varying phase difference φ(t) and the sampling information 63 may be expressed as the time varying orientation angle θ(t). The first input may be expressed as {φ(t$_1$), φ(t$_2$), φ(t$_3$), φ(t$_4$), φ(t$_5$), ... }. The second input may be expressed as {θ(t$_1$), θ(t$_2$), θ(t$_3$), θ(t$_4$), θ(t$_5$), ... }.

In the example described with reference to FIGS. 2A to 2C, the comparison between characteristics is a comparison between the sense of the phase difference φ(t$_n$) and the sense of the orientation angle θ(t$_n$).

The comparison block 62 may determine for example whether the sense of phase difference φ(t$_n$) and the sense of the orientation angle θ(t$_n$) are the same or are opposite. This may be achieved by having a change in sense of phase difference φ(t$_n$) and the orientation angle θ(t$_n$) occurring synchronously at their mid range and by multiplying the phase difference φ(t$_n$) and the orientation angle θ(t$_n$) together as illustrated in column 4 of Tables 1 & 2 in FIGS. 3A and 3B. The results of the multiplication are then integrated at block 64 to produce audio control information. If the sense of phase difference φ(t$_n$) and the orientation angle θ(t$_n$) are the same then the integration result is strongly positive. If the sense of phase difference φ(t$_n$) and the orientation angle θ(t$_n$) are opposite then the integration result is strongly negative. Therefore the sense of the integration result may be provided as audio control information 9 that disambiguates a bearing/location of an audio source. If the sense is positive, the audio source is located forward of the microphone array 12 (Table 1, FIG. 3A). If the sense is negative, the audio source is located backward of the microphone array 12 (Table 2, FIG. 3B).

In an alternative implementation, the comparison block 62 may determine for example whether a 'motion vector' for the phase difference φ(t$_n$) and a motion vector for the orientation angle θ(t$_n$) are the same or are opposite. This may be achieved by comparing, for example, φ(t$_n$)−φ(t$_{n-1}$) with θ(t$_n$)−θ(t$_{n-1}$) for each value of n. This may be achieved by multiplying φ(t$_n$)−φ(t$_{n-1}$) with θ(t$_n$)−θ(t$_{n-1}$). The results of the multiplication are then integrated at block 64 to produce audio control information.

In another implementation, explained with reference to the example illustrated in FIGS. 2A to 2C, the phase information may be derived from the time varying phase difference φ(t). The time varying phase difference φ(t) may be represented using converted to a bearing Ω(t) for the audio source 16 using, for example, a look-up table. As the time varying bearing Ω(t) and the time varying orientation angle θ(t) are in the same units a direct comparison may be made between Ω(t) and θ(t) or between Ω(t$_m$)−Ω(t$_{m-1}$) and θ(t$_m$)−θ(t$_{m-1}$).

In some implementations, the audio control information 9 may be based upon the separate processing 36 of phase information for different frequency bands and the sampling information. The time-varying phase difference between captured audio channels may be obtained for different frequency bands simultaneously.

A transformer may be used to transform the input audio signals 3 (two or more input audio channels) from time domain into frequency domain using for example filterbank decomposition over discrete time frames. The filterbank may be critically sampled. Critical sampling implies that the amount of data (samples per second) remains the same in the transformed domain. A transformer used for audio encoding may be used for this purpose.

Channels of the input audio signal are transformed separately to frequency domain, i.e. in a frequency sub-band for an input frame time slot. The input audio channels are segmented into time slots in the time domain and sub bands in the frequency domain.

The segmenting may be uniform in the time domain to form uniform time slots e.g. time slots of equal duration. The segmenting may be uniform in the frequency domain to form uniform sub bands e.g. sub bands of equal frequency range or the segmenting may be non-uniform in the frequency domain to form a non-uniform sub band structure e.g. sub bands of different frequency range. In some implementations the sub bands at low frequencies are narrower than the sub bands at higher frequencies.

Audio control information 9 can be generated for each sub band by processing 62 the phase information 61 for a sub band and the sampling information 63. This enables disambiguation of simultaneous sound sources. It may also give some robustness if sound sources are moving. It would be beneficial to align the frequency bands in the phase information detection process in a similar way to the audio encoder, so that in some implementations, the phase detection may be integrated in an audio scene analysis block.

Referring back to FIG. 1, the spatial rendering block 10 uses the control information 9 produced by the disambiguation block 8 to control spatial rendering by multiple loudspeakers 22 and to disambiguate a location of a sound source in the spatially rendered audio.

Figures 3A, 3B, 4:
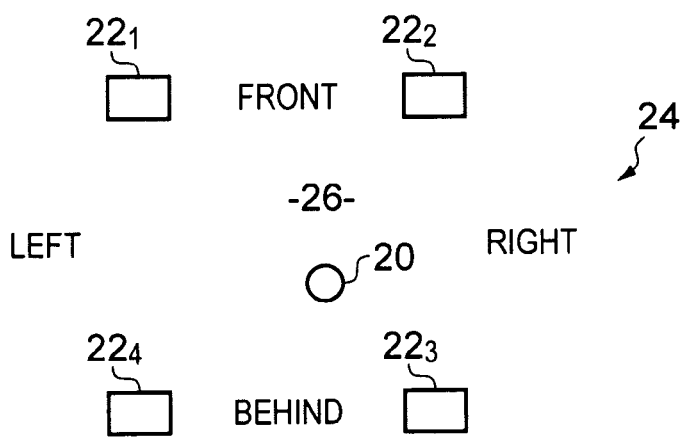
FIG. 3A illustrates a table that records an example of disambiguating control information for a forward located audio source.
FIG. 3B illustrates a table that records an example of disambiguating control information for a backward located audio source.
FIG. 4 schematically illustrates an example of a loudspeaker configuration.

Referring to FIG. 4, there is schematically illustrated an example of a possible, but not necessarily typical, loudspeaker configuration 24. The loudspeakers 22 are arranged around a location of a listener 20 to create spatial audio. The spatial audio surrounds the listener 20 on at least four sides (e.g. front, behind, left, right) creating a rendered audio space 26.

The loudspeaker configuration 24 has M loudspeakers. M may be greater than N the number of microphones present in the microphones array 12. Alternatively M may be smaller than (or equal to) N. One or more loudspeakers 22$_1$, 22$_2$, are positioned in front of the listener 20 and one or more loudspeakers 22$_3$, 22$_4$, are positioned behind the listener 20. One or more loudspeakers 22$_1$, 22$_4$, are positioned to the right of the listener 20 and one or more loudspeakers 22$_2$, 22$_3$, are positioned to the right of the listener. Although four regularly arranged loudspeakers 22$_1$, 22$_2$, 22$_3$, 22$_4$ are illustrated in FIG. 4 it should be appreciated that different positional arrangements of loudspeakers are possible and that different numbers of loudspeakers may be used. The time varying spatial sampling performed by the spatial sampling block 4 samples over a space equivalent to the audio space 26. That is, the two or three orthogonal vectors that span the sampled audio space also span the rendered audio space 26.

The control information 9 resolves the position/bearing of an audio source within the rendered audio space 26.

If the control information 9, for example, indicates that a position of an audio source has been disambiguated to be forward of the listener 20, the gain applied to the forward loudspeaker(s) 22$_1$, 22$_2$, for that audio source may be increased and the gain applied to the backward loudspeaker(s) 22$_3$, 22$_4$, for that audio source may be decreased. The differential gain in favor of the forward loudspeakers locates the audio source forward of the listener in the audio space.

If the control information 9, for example, indicates that a position of an audio source has been disambiguated to be backward of the listener, the gain applied to the backward loudspeaker(s) for that audio source may be increased and the gain applied to the forward loudspeaker(s) for that audio source may be decreased. The differential gain in favor of the backward loudspeakers locates the audio source backward of the listener in the audio space.

In some circumstances it may be necessary to compensate for the time varying rotation of the rendered audio 26 space resulting from the time-varying spatial sampling of the captured audio channels. A time varying function may be used to provide this spatial compensation such that the rendered audio space 26 defined by the multiple loudspeakers 22 remains stationary with respect to the listener 20. The time varying function may be the inverse transfer function for time-varying spatial sampling.

The time varying function performs a compensating time varying rotation of the audio space using the obtained sampling information. This may be achieved by modifying the audio parameters or by filtering the rendered audio. For example, a modified head related transfer function (HRTF) may be used that provides phase compensation with/without level compensation.

In some circumstances, compensation for the rotation of the audio space may not be required. For example when the microphone array 12 oscillates quickly with a very small displacement. As another example, it may be possible to arrange for the audio capture rate to be greater for the purpose of disambiguation than for the purpose of audio encoding. Thus, referring to FIGS. 2A to 2C, audio capture for encoding may only occur when the array is positioned as illustrated in FIG. 2B whereas audio capture for disambiguation may occur when the array is positioned as illustrated in each of the FIGS. 2A-2C and as it moves between the FIGS. 2A-2C.

The spatial rendering block 10 may, in some but not all implementations, provide a feedback signal 11 to the spatial sampling block 4 to control spatial sampling. The feedback signal 11 may, for example, adapt the time varying spatial sampling by for example changing the direction of movement of the microphone array. This may improve disambiguation performance by controlling motion of the microphone array 12 so that they range over a space that corresponds to the rendered audio space 26 defined by the positions of the loudspeakers 22.

The parameterization block 6 may be present if the bandwidth occupied by the audio channels needs to be reduced for storage or communication. The parameterization block 6 parametrically encodes the N audio channels 3 to produce parameterized audio 7. The spatial rendering block 10 subsequently receives the parameterized audio and decodes the parameterized audio to produce spatial audio.

Different types of parametric audio encoding may be used such as, for example, Directional Audio Coding (DirAC) or binaural cue coding (BCC).

Figure 6:
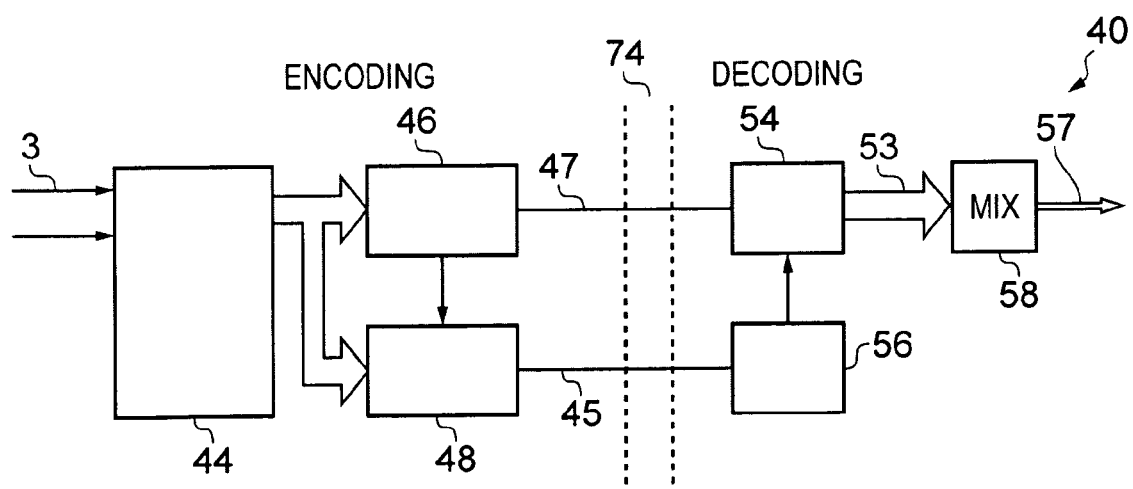
FIG. 6 schematically illustrates a decoder apparatus which receives input signals from an encoder apparatus.

FIG. 6 schematically illustrates an encoder apparatus 42 that provides parameterized audio signals 47, 45 to a remote decoder apparatus 40.

The illustrated multichannel audio encoder apparatus 42 is, in this example, a parametric encoder that encodes according to a defined parametric model making use of multi channel audio signal analysis.

The parametric model is, in this example, a perceptual model that enables lossy compression and reduction of bandwidth.

The encoder apparatus 42, in this example, performs spatial audio coding using a parametric coding technique, such as binaural cue coding (BCC) parameterisation. Generally parametric audio coding models such as BCC represent the original audio as a downmix signal comprising a reduced number of audio channels formed from the channels of the original signal, for example as a monophonic or as two channel (stereo) sum signal, along with a bit stream of parameters describing the spatial image. A downmix signal comprising more than one channel can be considered as several separate downmix signals.

A transformer 44 transforms the input audio signals 3 (two or more input audio channels) from time domain into frequency domain using for example filterbank decomposition over discrete time frames. The filterbank may be critically sampled. Critical sampling implies that the amount of data (samples per second) remains the same in the transformed domain.

The filterbank could be implemented for example as a lapped transform enabling smooth transients from one frame to another when the windowing of the blocks, i.e. frames, is conducted as part of the subband decomposition. Alternatively, the decomposition could be implemented as a continuous filtering operation using e.g. FIR filters in polyphase format to enable computationally efficient operation.

Channels of the input audio signal are transformed separately to frequency domain, i.e. in a frequency sub-band for an input frame time slot. The input audio channels are segmented into time slots in the time domain and sub bands in the frequency domain.

The segmenting may be uniform in the time domain to form uniform time slots e.g. time slots of equal duration. The segmenting may be uniform in the frequency domain to form uniform sub bands e.g. sub bands of equal frequency range or the segmenting may be non-uniform in the frequency domain to form a non-uniform sub band structure e.g. sub bands of different frequency range. In some implementations the sub bands at low frequencies are narrower than the sub bands at higher frequencies.

From perceptual and psychoacoustical point of view a sub band structure close to ERB (equivalent rectangular bandwidth) scale is preferred. However, any kind of sub band division can be applied.

An output from the transformer 44 is provided to audio scene analyser 48 which produces scene parameters 45. The audio scene is analysed in the transform domain and the corresponding parameterisation 45 is extracted and processed for transmission or storage for later consumption.

The audio scene analyser 48 uses an inter-channel prediction model to form inter-channel parameters 45. The inter-channel parameters may, for example, comprise inter-channel level difference (ILD) and the inter-channel phase difference (ICPD). The inter-channel phase difference (ICPD) may be expressed as the inter-channel time difference (ITD). In addition, inter-channel coherence (ICC) for a frequency sub-band for an input frame between selected channel pairs may be determined. The inter-channel parameters may be estimated within a transform domain time-frequency slot, i.e. in a frequency sub-band for an input frame. Typically, ILD, ICPD/ITD and ICC parameters are determined for each time-frequency slot of the input signal, or a subset of time-frequency slots. A subset of time-frequency slots may represent for example perceptually most important frequency components, (a subset of) frequency slots of a subset of input frames, or any subset of time-frequency slots of special interest. The perceptual importance of inter-channel parameters may be different from one time-frequency slot to another. Furthermore, the perceptual importance of inter-channel parameters may be different for input signals with different characteristics. As an example, for some input signals ITD parameter may be a spatial image parameter of special importance.

The ILD and ITD parameters may be determined between an input audio channel and a reference channel, typically between each input audio channel and a reference input audio channel. The ICC is typically determined individually for each channel compared to reference channel.

In the following, some details of the BCC approach are illustrated using an example with two input channels L, R and a single downmix signal. However, the representation can be generalized to cover more than two input audio channels and/or a configuration using more than one downmix signal.

The inter-channel level difference (ILD) for each subband $\Delta L_n$ is typically estimated as:

$$\Delta L_n = 10\log_{10}\left(\frac{s_n^L {}^T s_n^L}{s_n^R {}^T s_n^R}\right) \quad (1)$$

where $s_n^L$ and $s_n^R$ are time domain left and right channel signals in subband n, respectively.

The inter-channel time difference (ITD), i.e. the delay between the two input audio channels, may be determined in as follows $$\tau_n = \arg\max_d \{\phi_n(k,d)\} \quad (2)$$

where $\phi_n(d,k)$ is normalised correlation $$\Phi_n(d,k) = \frac{s_n^L(k-d_1)^T s_n^R(k-d_2)}{\sqrt{(s_n^L(k-d_1)^T s_n^L(k-d_1))(s_n^R(k-d_2)^T s_n^R(k-d_2))}} \quad (3)$$

where $d_1 = \max\{0,-d\}$ $d_2 = \max\{0,d\} \quad (4)$

The normalised correlation of Equation (3) is actually the interchannel coherence (IC) parameter. It may be utilised for capturing the ambient components that are decorrelated with the sound components represented by phase and magnitude parameters in Equations (1) and (2).

Alternatively, BCC coefficients may be determined in Discrete Fourier Transform (DFT) domain. Using for example windowed Short Time Fourier Transform (STFT), the subband signals above are converted to groups of transform coefficients. $S_n^L$ and $S_n^R$ are the spectral coefficient two input audio channels L, R for subband $n$ of the given analysis frame, respectively. The transform domain ILD may be determined as in Equation (1)

$$\Delta L_n = 10\log_{10}\left(\frac{S_n^L * S_n^L}{S_n^R * S_n^R}\right), \quad (5)$$

where * denotes complex conjugate.

However, the time difference (ITD) may be more convenient to handle as an interchannel phase difference (ICPD)

$$\phi_n = <(S_n^L * S_n^R), \quad (6)$$

Interchannel coherence may be computed in frequency domain using a computation quite similar to one used in time domain calculation in Equation (3):

$$\Phi_n = \frac{S_n^L * S_n^R}{\sqrt{(S_n^L * S_n^L)(S_n^R * S_n^R)}} \quad (7)$$

The alternative BCC determination based on Equations (5)-(7) in DFT domain may require significantly less computation, when the ICPD phase estimation of DFT domain spectral coefficients is used instead of the time domain ITD estimation using the correlation estimate.

The level and time/phase difference cues represent the dry surround sound components, i.e. they can be considered to model the sound source locations in space. Basically, ILD and ITD cues represent surround sound panning coefficients.

The coherence cue, on the other hand, is dependent upon the relation between coherent and decorrelated sounds. The level of late reverberation of the sound sources e.g. due to the room effect, and the ambient sound distributed between the input channels may have a significant contribution to the perceived spatial audio sensation.

A downmixer 46 creates downmix signal(s) 47 as a combination of channels of the input signals.

The downmix signal is typically created as a linear combination of channels of the input signal in transform domain. For example in a two-channel case the downmix may be created simply by averaging the signals in left and right channels:

$$S_n = \frac{1}{2}(S_n^L + S_n^R)$$

There are also other means to create the downmix signal. In one example the left and right input channels could be weighted prior to combination in such a manner that the energy of the signal is preserved. This may be useful e.g. when the signal energy on one of the channels is significantly lower than on the other channel or the energy on one of the channels is close to zero.

An optional inverse transformer may be used to produce downmixed audio signal 47 in the time domain.

Alternatively the inverse transformer may be absent. The output downmixed audio signal 47 is consequently encoded in the frequency domain.

The output of a multi-channel or binaural encoder typically comprises the encoded downmix audio signal or signals 47 and the scene parameters 45. This encoding may be provided by separate encoding blocks (not illustrated) for signal 47 and 45. Any mono (or stereo) audio encoder is suitable for the downmixed audio signal 47, while a specific BCC parameter encoder is needed for the inter-channel parameters 45. The inter-channel parameters may, for example include one or more of the inter-channel level difference (ILD), and the inter-channel phase difference (ICPD), for example the inter-channel time difference (ITD).

The inter-channel time difference (ITD) may be used as the phase information in block 32 of FIG. 5.

The decoder apparatus 52, which is typically separated from the encoder apparatus 42 by a communications channel 74, comprises a synthesis block 54 and a parameter processing block 56. The signal synthesis, for example BCC synthesis, may occur at the synthesis block 54 based on parameters provided by the parameter processing block 56.

A frame of downmixed signal(s) 47 consisting of N samples $s_0, \ldots, s_{N-1}$ is converted to N spectral samples $S_0, \ldots, S_{N-1}$ e.g. with DTF transform.

Inter-channel parameters 45, for example ILD and/or ITD described above, are output from the parameter processing block 56 and applied in the synthesis block 54 to create spatial audio signals, in this example binaural audio, in a plurality (N) of output audio channels 53.

When the downmix for two-channel signal is created according to the equation above, and the ILD $\Delta L_n$ is determined as the level difference of left and right channel, the left and right output audio channel signals may be synthesised for subband n as follows $$S_n^L = \frac{1}{2} \frac{\Delta L_n}{\Delta L_n + 1} S_n e^{-j\frac{2\pi n \tau_n}{2N}}$$

$$S_n^R = \frac{1}{2} \frac{1}{\Delta L_n + 1} S_n e^{j\frac{2\pi n \tau_n}{2N}},$$

where $S_n$ is the spectral coefficient vector of the reconstructed downmixed signal, $S_n^L$ and $S_n^R$ are the spectral coefficients of left and right binaural signal, respectively.

It should be noted that the synthesis using frequency dependent level and delay parameters recreates the sound components representing the audio sources. The ambience may still be missing and it may be synthesised for example by using the inter-channel coherence parameter ICC.

A method for synthesis of the ambient component based on the coherence cue consists of decorrelation of a signal to create late reverberation signal. The implementation may consist of filtering output audio channels using random phase filters and adding the result into the output. When a different filter delays are applied to output audio channels, a set of decorrelated signals is created.

The multi-channel output of the synthesis block 54 may be mixed, by a mixer 58 into a plurality (K) of output audio channels 57.

This allows rendering of different spatial mixing formats. For example, the mixer 58 may be responsive to audio control information 9 to change the mixing and the nature and number of the output audio channels 57. The origin of the audio control information 9 may be understood from the paragraphs below relating to FIGS. 8 and 9. In practice this means that for example a sound source may be forced to be represented as coming from, for example, in front of the listener by controlling the gain of the loudspeakers for that sound source. If headphones are used, HRTF based spatialization may be used.

Figure 8:
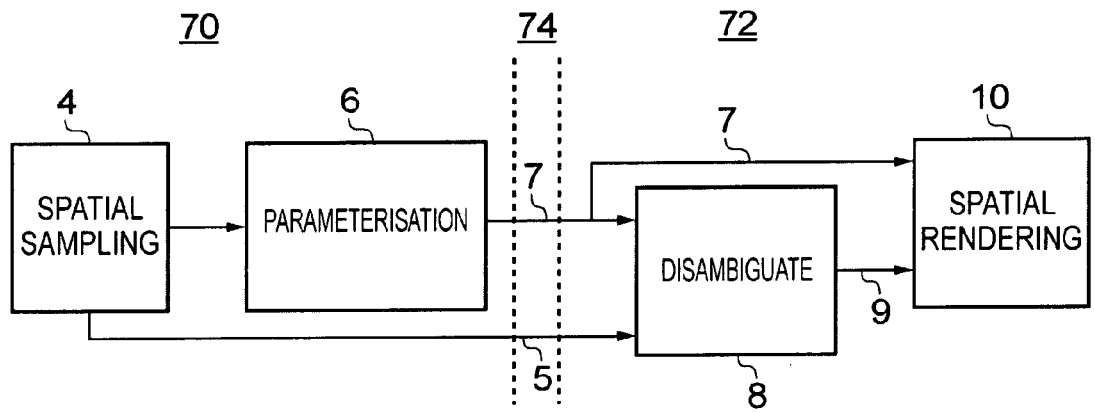
FIG. 8 schematically illustrates an implementation in which the production of the disambiguating control information occurs at the decoder.

FIG. 8 schematically illustrates an implementation in which the spatial sampling block and the parameterization block are performed by an encoding apparatus 70 and the disambiguating block 8 and the spatial rendering block 10 are performed by a decoding apparatus 70. The encoding apparatus 70 sends parameterized audio 7 across a communications channel 74 to the decoder apparatus 72. The encoding apparatus 70 sends sampling information 5 relating to time varying spatial sampling of the captured audio channels across a communications channel 74 to the decoder apparatus 72.

Figure 9:
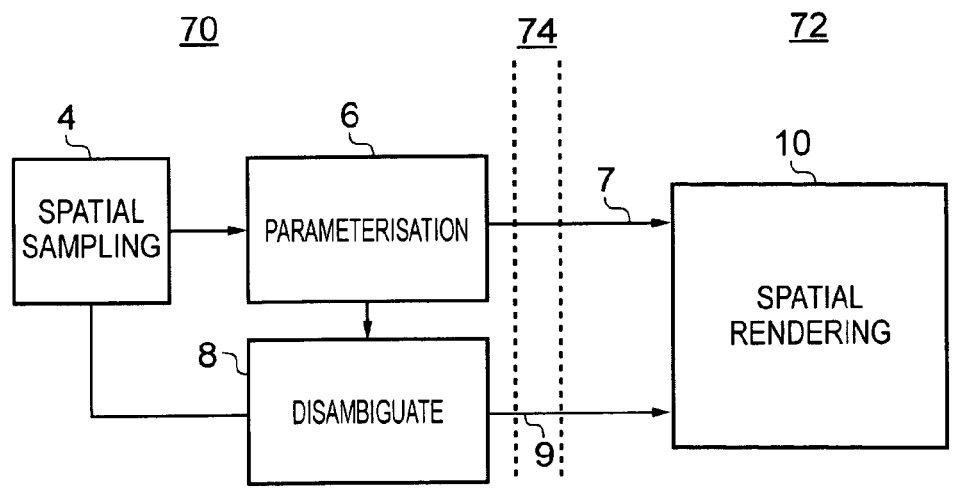
FIG. 9 schematically illustrates an implementation in which the production of the disambiguating control information occurs at the encoder.

FIG. 9 schematically illustrates an implementation in which the spatial sampling block 4, the parameterization block 6 and the disambiguation block 8 are performed by an encoding apparatus 70 and the spatial rendering block 10 is performed by a decoding apparatus 70. The encoding apparatus 70 sends encoded audio 7 across a communications channel 74 to the decoder apparatus 72. The encoding apparatus 70 generates and sends audio control information 9 across a communications channel 74 to the decoder apparatus 72. The decoding apparatus 72 receives the parameterized audio 7 and the audio control information 9. The encoding apparatus 70 may also send sampling information 5 to enable spatial compensation by the decoder apparatus 72.

The inter-channel representation could be done with DirAC parameterisation instead of binaural cue coding (BCC) parameterization. In Dir AC parameterization, the direction of arrival of a sound source is determined for each time-frequency component of the multi-channel audio using e.g. inter-channel time and level differences. The desired directional information can then be extracted applying panning law. One advantage of DirAC parameterisation is that disambiguation of the direction of arrival for a sub-band could be resolved in the encoder. In this case, no additional side information (audio control information 9) needs to be communicated across a communications channel 74 to the decoder.

In DirAC format, a direction vector (azimuth θ and elevation φ (and diffuseness ψ)) is associated to each frequency sub band. Generation of DirAC format may be generated from signals that are recorded using two microphones or from BCC coded parameters using positional disambiguation as described above to unambiguously locate the audio source before DirAC encoding.

Figure 10:
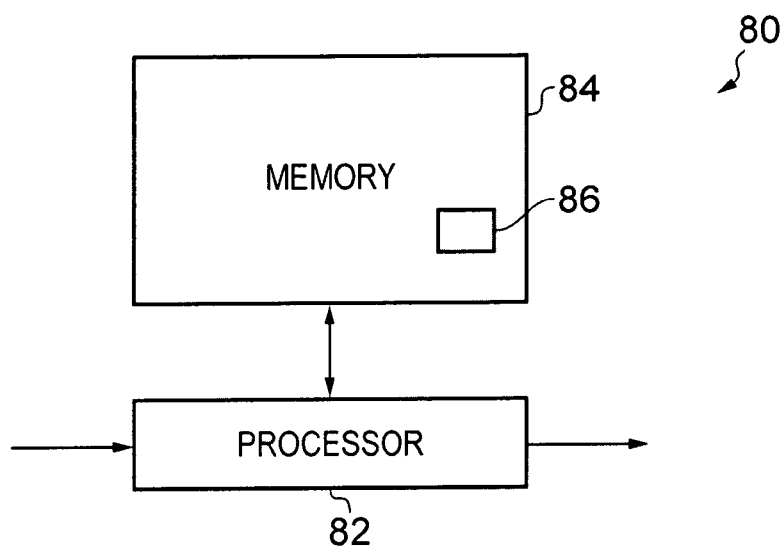
FIG. 10 schematically illustrates an apparatus suitable for use as part of an encoder apparatus or a decoder apparatus.

FIG. 10 schematically illustrates an apparatus 80 suitable for use as part of an encoder apparatus or a decoder apparatus.

A processor 82 is configured to read from and write to a memory 84. The processor 82 may also comprise an output interface via which data and/or commands are output by the processor 82 and an input interface via which data and/or commands are input to the processor 82.

The memory 84 stores a computer program 86 comprising computer program instructions that control the operation of the apparatus when loaded into the processor 82. The computer program instructions 86 provide the logic and routines that enables the apparatus 80 to perform the methods illustrated in FIGS. 1, 5, 6-9. The processor 82 by reading the memory 84 is able to load and execute the computer program 86.

Figure 11:
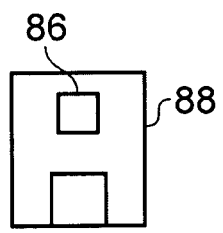
FIG. 11 schematically illustrates a delivery mechanism for a computer program.

Referring to FIG. 11, the computer program may arrive at the apparatus 80 via any suitable delivery mechanism 88. The delivery mechanism 88 may be, for example, a computer-readable storage medium, a computer program product, a memory device, a record medium such as a CD-ROM or DVD, an article of manufacture that tangibly embodies the computer program 86. The delivery mechanism may be a signal configured to reliably transfer the computer program 86. The apparatus 80 may propagate or transmit the computer program 86 as a computer data signal.

Although the memory 84 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The apparatus 80, may be provided in a module. As used here 'module' refers to a unit or apparatus that excludes certain parts/components that would be added by an end manufacturer or a user.

The blocks illustrated in the FIG. 5 may represent steps in a method and/or sections of code in the computer program 86. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Although some of the examples described above, relate to a linear microphone array that oscillates from forward to back and therefore disambiguates between front and back, in other embodiments the spatial sampling may occur in a different two-dimensional plane. For example, a linear microphone array that oscillates from up to down could be used to disambiguate between up and down. In other embodiments, the spatial sampling may occur in three dimensions by for example rotating an array of microphones or selectively enabling microphones in a 3D array. Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
    obtaining phase information dependent upon a time-varying phase difference between captured audio channels;
    obtaining sampling information relating to time-varying spatial sampling of the captured audio channels; and
    processing the phase information and the sampling information to determine audio control information for controlling spatial rendering of the captured audio channels, wherein the processing compares a sense of change of the phase information and a sense of change of the sampling information, and the sense of change comprises changing of direction of relative movement of each audio channel.

2. A method as claimed in claim 1, wherein the processing:
    determines a first motion vector based on the phase information;
    determines a second motion vector for the spatial sampling; and
    compares the first and second motion vectors.

3. A method as claimed in claim 1, wherein the processing:
    determines a direction of arrival from the phase information;
    determines a first motion vector for the direction of arrival:
    determines a second motion vector for the spatial sampling: and
    compares the first and second motion vectors.

4. A method as claimed in claim 1, wherein the phase information is a parametric audio encoding parameter.

5. A method as claimed in claim 1, further comprising:
    determining phase information for each of a plurality of frequency sub bands and processing the phase information for each of the plurality of frequency sub bands and the sampling information to determine audio control information for controlling spatial rendering of the captured audio channels.

6. A method as claimed in claim 1, further comprising:
performing time varying spatial sampling of the captured audio channels by audio sampling at different microphone positions at different times, wherein each audio channel has an associated microphone; and the time varying spatial sampling comprises changing of the direction of relative movement of the associated microphone of each audio channel.

7. A non-transitory computer readable storage medium having computer-executable program code portions stored therein, the computer-executable program code portions comprising program code instructions which, when executed by one or more processors, cause an apparatus to at least perform the following:
    process phase information dependent upon a time-varying phase difference between captured audio channels and sampling information relating to time-varying spatial sampling of the captured audio channels to determine audio control information for controlling spatial rendering of the captured audio channels, wherein the processing compares a sense of change of the phase information and a sense of change of the sampling information, and the sense of change comprises changing of direction of relative movement of each audio channel.

8. An apparatus comprising:
    at least one processor; and
    at least one memory including computer program code for one or more programs,
    the at least one memory and the computer program code configured to, with the at least one processor, cause the apparatus to perform at least the following:
    obtain phase information dependent upon a time-varying phase difference between captured audio channels;
        obtain sampling information relating to time-varying spatial sampling of the captured audio channels; and
        process the phase information and the sampling information to determine audio control information for controlling spatial rendering of the captured audio channels, wherein the processing compares a sense of change of the phase information and a sense of change of the sampling information, and the sense of change comprises changing of direction of relative movement of each audio channel.

9. An apparatus as claimed in claim 8, wherein the apparatus is further caused to:
    determine a first motion vector based on the phase information;
    determine a second motion vector for the spatial sampling; and
    compare the first and second motion vectors.

10. An apparatus as claimed in claim 8, wherein the apparatus is further caused to:
    determine a direction of arrival from the phase information;
    determine a first motion vector for the direction of arrival:
    determine a second motion vector for the spatial sampling: and
    compare the first and second motion vectors.

11. An apparatus as claimed in claim 8, wherein the phase information is a parametric audio encoding parameter.

12. An apparatus as claimed in claim 8, wherein the apparatus is further caused to:
    determine phase information for each of a plurality of frequency sub bands and process the phase information for each of the plurality of frequency sub bands and the sampling information to determine audio control information for controlling spatial rendering of the captured audio channels.

13. An apparatus as claimed in claim 8, wherein the apparatus is further caused to:
    perform time varying spatial sampling of the captured audio channels by audio sampling at different microphone positions at different times, wherein each audio channel has an associated microphone; and the time varying spatial sampling comprises changing of the direction of relative movement of the associated microphone of each audio channel.

14. An apparatus as claimed in claim 13, wherein the apparatus is further caused to:
    control movement a fixed microphone array, at a fixed location, through different orientations to perform time varying spatial audio sampling.

15. An apparatus as claimed in claim 8, wherein the apparatus is further caused to:
    perform parametric audio encoding to produce a reference audio signal and audio parameters and to send the reference audio signal and the audio parameters to a remote destination for spatial rendering of the captured audio channels.

\* \* \* \* \*